United States Patent
Maurer

(10) Patent No.: US 8,869,680 B2
(45) Date of Patent: Oct. 28, 2014

(54) DEEP FRYER ARRANGEMENT

(75) Inventor: Ulrich Maurer, Wallisellen (CH)

(73) Assignee: Ulrich Maurer, Wallisellen (CH)

( * ) Notice: Subject to any disclaimer, the term of this patent is extended or adjusted under 35 U.S.C. 154(b) by 462 days.

(21) Appl. No.: 12/595,632

(22) PCT Filed: Apr. 3, 2008

(86) PCT No.: PCT/CH2008/000146
§ 371 (c)(1),
(2), (4) Date: Dec. 3, 2009

(87) PCT Pub. No.: WO2008/124954
PCT Pub. Date: Oct. 23, 2008

(65) Prior Publication Data
US 2010/0092626 A1  Apr. 15, 2010

(51) Int. Cl.
*A47J 37/12* (2006.01)
*A23L 1/01* (2006.01)

(52) U.S. Cl.
CPC .......... *A47J 37/1228* (2013.01); *A47J 37/1214* (2013.01)
USPC ............................... 99/407; 99/409

(58) Field of Classification Search
CPC ........................ A47J 37/1228; A47J 37/1214
USPC .............. 99/355, 352, 404, 443 C, 407, 409; 426/233
See application file for complete search history.

(56) References Cited

U.S. PATENT DOCUMENTS

| | | | | |
|---|---|---|---|---|
| 3,398,672 A | * | 8/1968 | Hoeberigs | 99/407 |
| 3,419,015 A | * | 12/1968 | Wochnowski | 131/306 |
| 3,685,432 A | * | 8/1972 | Hoeberigs | 99/357 |
| 4,006,265 A | * | 2/1977 | Tamas et al. | 426/623 |
| 4,228,730 A | | 10/1980 | Schindler et al. | |
| 5,003,868 A | * | 4/1991 | Higgins et al. | 99/357 |
| 5,142,968 A | * | 9/1992 | Caron et al. | 99/404 |
| 5,224,415 A | * | 7/1993 | McFadden et al. | 99/357 |
| 7,617,765 B2 | * | 11/2009 | Maurer | 99/404 |
| 8,113,108 B2 | * | 2/2012 | Weiss | 99/443 C |
| 2003/0205028 A1 | | 11/2003 | Sus et al. | |

FOREIGN PATENT DOCUMENTS

| | | | |
|---|---|---|---|
| EP | 1025787 A1 | 8/2000 | |
| WO | 2004014206 A1 | 2/2004 | |
| WO | WO 2006097448 A1 * | 9/2006 | A21B 1/48 |

OTHER PUBLICATIONS

International Search Report dated Mar. 7, 2008.

* cited by examiner

*Primary Examiner* — Jianying Atkisson
(74) *Attorney, Agent, or Firm* — Bachman & LaPointe, P.C.

(57) ABSTRACT

An automated fryer having a storage container for food, the storage container having an outlet opening, a cooking drum for accommodating liquid fat or oil, the cooking drum having a loading opening and a removal opening; a rotatable turner provided in the cooking drum for moving the food in the cooking drum; and transport means for transporting the food from the outlet opening of the storage container to the loading opening of the cooking drum; in an operating position of the automated fryer, the outlet opening of the storage container is located below the loading opening of the cooking drum, and the transport means being designed to comprise a drive in order to transport the food upward from the outlet opening of the storage container to the loading opening of the cooking drum.

16 Claims, 4 Drawing Sheets

DEEP FRYER ARRANGEMENT

BACKGROUND

1. Field of the Invention

The present invention relates to an automated fryer as claimed in the preamble of claim 1 and to a method for operating an automated fryer as claimed in the preamble of claim 16.

2. Prior Art

WO 2004/014206 discloses a frying device that includes a storage container and a cooking drum, which is connected to the storage container by means of a transportation pipe, a rotatable agitator being located in said cooking drum. When the machine is operating, food, e.g. frozen chips, is transported from the storage container into the cooking drum that contains liquefied cooking fat, where, by means of the slowly rotating agitator, it is transported into a removal drum that has a discharging conveyor chute. At the same time the rotational speed of the agitator is selected such that the food is cooked through during the dwell time in the cooking drum.

In the case of the frying device in WO 2004/014206, the storage container for the food is located above the cooking drum. The advantage of this is that the food can be moved into the cooking drum by means of gravity. A disadvantage of said arrangement, however, is that rising, hot water vapor is able to pass into the cooled storage container where it immediately turns to ice again in the temperatures prevailing there. This can result in the food sticking to the cold walls of the storage container, of its outlet opening and/or of the transportation pipe and the transportation being interrupted.

SUMMARY OF THE INVENTION

Proceeding from this unsatisfactory situation, the object of the invention is to propose a deep fryer arrangement where the aforementioned problems do not occur. For the automated fryer, operating reliability is to be increased and the amount of money and time spent on cleaning is to be reduced—compared to known automated fryers. In particular, one objective is to propose a compact deep fryer arrangement so that it is also possible to set up the deep fryer in cramped locations. Another objective is to propose a deep fryer with which food can be cooked gently.

The object is achieved according to the invention by an automated fryer having a storage container for food, the storage container having an outlet opening, a cooking drum for accommodating liquid fat or oil, the cooking drum having a loading opening and a removal opening; a rotatable turner provided in the cooking drum for moving the food in the cooking drum; and transport means for transporting the food from the outlet opening of the storage container to the loading opening of the cooking drum; in an operating position of the automated fryer, the outlet opening of the storage container is located below the loading opening of the cooking drum, and the transport means being designed to comprise a drive in order to transport the food upward from the outlet opening of the storage container to the loading opening of the cooking drum. The object is also achieved by a method for operating an automated fryer that includes a cooking drum and a storage container, comprising the steps of food out of the storage container moving into the cooking drum, cooking the food in the cooking drum, and discharging the ready cooked food out of the cooking drum and transporting the food upward by means of driven transport means from an outlet opening of the storage container that is located below the cooking drum in the operating position to a loading opening of the cooking drum.

Known automated fryers are provided with a storage container for the food and an outlet opening is provided on said storage container. They also have a cooking drum for accommodating liquid fat or oil, said cooking drum including a loading opening and a removal opening. A rotatable turner for moving the food in the cooking drum is provided in the cooking drum. In addition, transport means are provided for transporting food from the outlet opening of the storage container to the loading opening of the cooking drum.

In the case of the known automated fryers, the transport means comprise guide channels in which the food slides downward under the effect of gravity from the outlet opening of the storage container located above the cooking drum towards the loading opening of the cooking drum.

The automated fryer according to the invention differs from such automated fryers in that in the operating position of the automated fryer, the outlet opening of the storage container is located below the loading opening of the cooking drum. In an expedient manner the storage container, in its entirety, is located below the cooking drum. A further difference is that the transport means is designed to comprise a drive in order to transport the food upward from the outlet opening of the storage container to the loading opening of the cooking drum.

The arrangement of the outlet opening below the loading opening, or of the storage container under the cooking drum has the disadvantage of having to provide a drive in order to be able to supply the food to the cooking drum. However, this arrangement has the advantages that the vapor rising from the cooking drum does not need to be guided past the outlet opening of the storage container and consequently is not able to pass into the guide channels and to the outlet opening at the storage container. Thanks to this measure, consequently, fouling of the outlet opening and of the transport means through fat depositions can be avoided, and formation of ice in the region of the outlet opening can be reduced in a considerable manner.

The transport means, driven in consequence of the arrangement according to the invention, can also be utilized in an advantageous manner to portion and weigh the food.

In an expedient manner the transport means has at least one moveable transport container. Said transport container is moveable from a bottom end position into a top end position. In the bottom end position it is located below the outlet opening of the storage container, in the top end position it is located above the loading opening of the cooking drum.

The transport container can be provided with a weighing device. The weighing device is connected in an expedient manner to a control means of a closure of the outlet opening so that the amount of food discharged into the transport container is able to be controlled.

To weigh the contents of the transport container, a weighing device is provided in a preferred manner in the region of the bottom end position of the transport means, the transport container being able to rest on said weighing device in the bottom end position.

The at least one transport container is located in an expedient manner on at least one guide rail. This enables precise guiding of the transport container from the bottom to the top end position and vice versa.

In an expedient manner the transport container is pivotable or tiltable in its top end position. This can be achieved by a corresponding embodiment of the guide rail and means interacting with said guide rail on the transport container. However, the transport container can also be realized so as to be displaceable by means of a pivot mechanism that is independent of the guide rail. The pivoting allows the food to be moved simply and gently into an accommodating means at the loading opening of the cooking drum.

In an advantageous manner the transport container is located on a carriage that is moveable along the guide rail. The weighing device and also the pivoting device can be provided between said carriage and the transport container.

In an advantageous manner the carriage is moveable by means of transport means, e.g. a spindle, a toothed belt or a chain, which is driven by means of an electric motor. For this purpose, the carriage is in operative connection with said transport means and is guided in the guide rail.

In an expedient manner a guide element is provided at the top end of the guide rail in order, interacting with the transport container, to utilize the transport movement of the transport container for generating a pivotal movement of the transport container. This means that the transport container is tilted before reaching the end position so that the food transported in said transport container slides out of the transport container into an accommodating means in front of the loading opening or slides out directly into the loading opening. In an advantageous manner, the loading opening is not opened until the transport container has moved away from the top end position so that the transport container does not come into contact with leaking fat and water vapors.

In a known manner per se the storage container is preferably a freezer container. This allows the contents of the storage container to be maintained in an optimum manner and ensures constant temperature conditions for each portion of food.

In a preferred embodiment in the case of the automated fryer, the storage container, the cooking drum and the transport means are located within a common housing. In this case, in an expedient manner, the storage container is located so as to be displaceable relative to the housing in order to be able to be filled or changed in a position pulled out of the housing. In a position pushed into the housing, the outlet opening opens out into the transport container that is located in the bottom end position. For this purpose the storage container can be located on rollers, guided in a rail, so that the storage container can be pulled out and pushed in without any resistance and at the same time it is possible to position the storage container in a precise manner. It is also possible to provide a plurality of exchangeable storage containers. One advantage of the arrangement of the storage container below the cooking drum, consequently, is that the storage container can be moved over the ground. Consequently, it can be removed from the housing without needing to be carried for this purpose.

A control means is provided in an expedient manner. Said control means is for synchronizing the transport of the food from the storage container to the cooking drum in dependence on the rotational speed of the turner, on the one hand, and on the number of food portions that the turner can accommodate on the other hand. The control means can also ensure that the outlet opening of the storage container can only be opened when the transport container is in the bottom end position. If the rotational speed of the turner and consequently the dwell time of the food in the cooking drum is adjustable, the cooking time can be matched to the food and to the desired cooking result.

Using such an automated fryer that includes a storage container, a cooking drum is operated by the food being moved out of the storage container into the cooking drum, being cooked in the cooking drum and the ready cooked food being discharged out of the cooking drum. However, unlike known methods, according to the invention the food is transported upward by means of driven transport means from an outlet opening of the storage container that is located below the cooking drum in the operating position to a loading opening of the cooking drum. The transporting of the food from the bottom to the top is a condition for being able to locate the storage container under the cooking drum and presupposes that the outlet opening is located below the loading opening. The method produces advantages with regard to the operating reliability of the device as the outlet opening of the storage container and the transport means are kept away from fat vapors and water vapor.

In an expedient manner the food is guided out of the outlet opening into a transport container, the transport container is moved upward towards the loading opening and the food is guided out of the transport container into the loading opening. The advantage of this compared, for example, to a screw conveyor or belt conveyor is that the transport container does not need to be exposed to the fat vapor either but can be removed again from the loading opening before said loading opening is opened.

Using a control means, the opening times of the closable outlet opening of the storage container and the transport movement of the transport container can be coordinated with one another. The food discharged from the storage container is advantageously weighed, in particular is weighed in the transport container. The weighing enables the food to be portioned in a constantly identical or a changing manner.

In an advantageous embodiment, it is possible to input the weight of the portions to be produced at a terminal. The portion is then measured, corresponding to the input, by automatically controlling a closure of the outlet opening. This means that it is possible to portion the food in an individual manner.

BRIEF DESCRIPTION OF THE DRAWINGS

The invention is described below with reference to the figures by way of an example for application. In this case identical reference numerals are used in each figure for identical parts. In which, in detail.

DETAILED DESCRIPTION OF THE PREFERRED EMBODIMENT(S)

Figure 1:
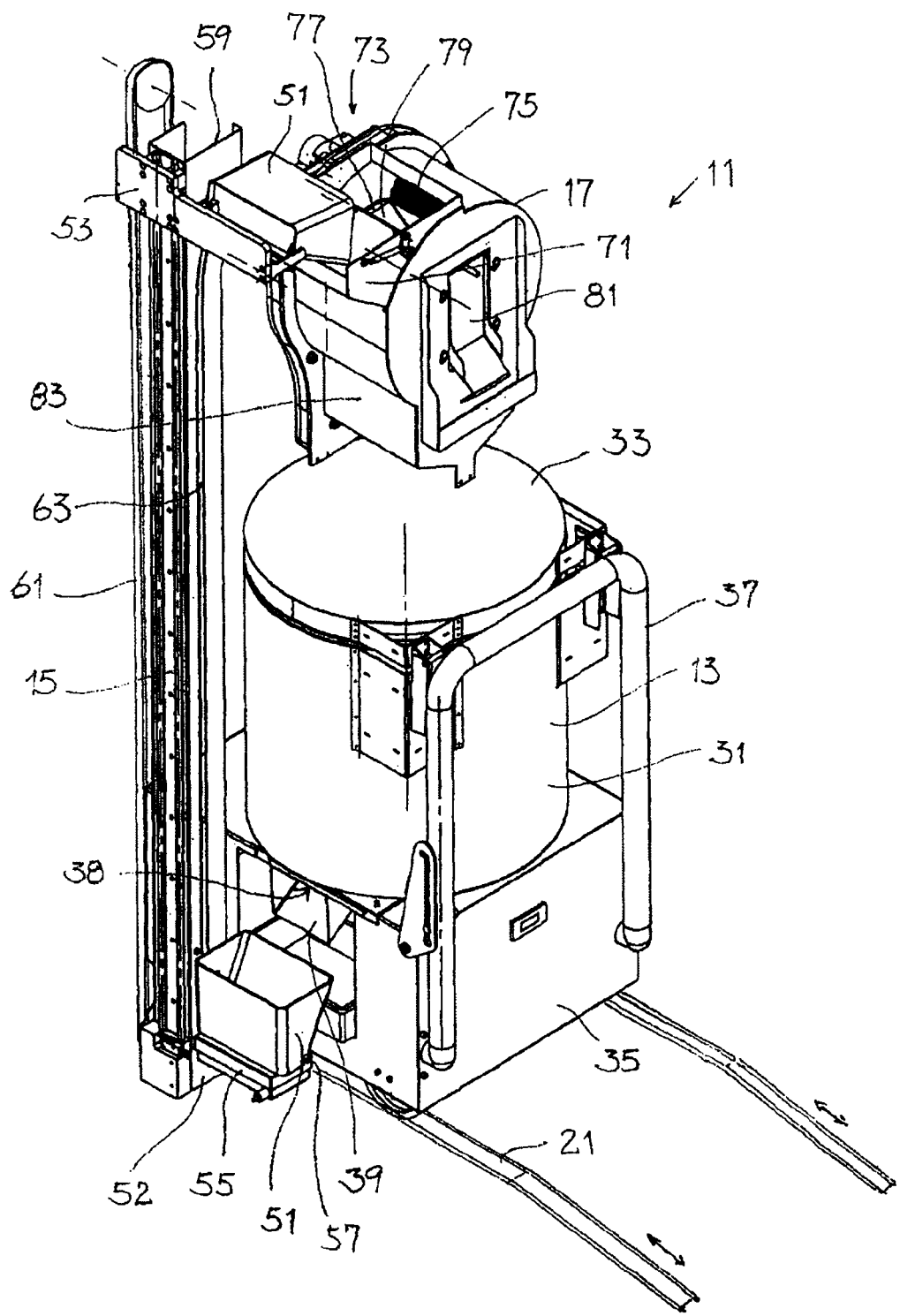
FIG. 1 shows a perspective representation of an automated fryer without a housing.
Figure 2:
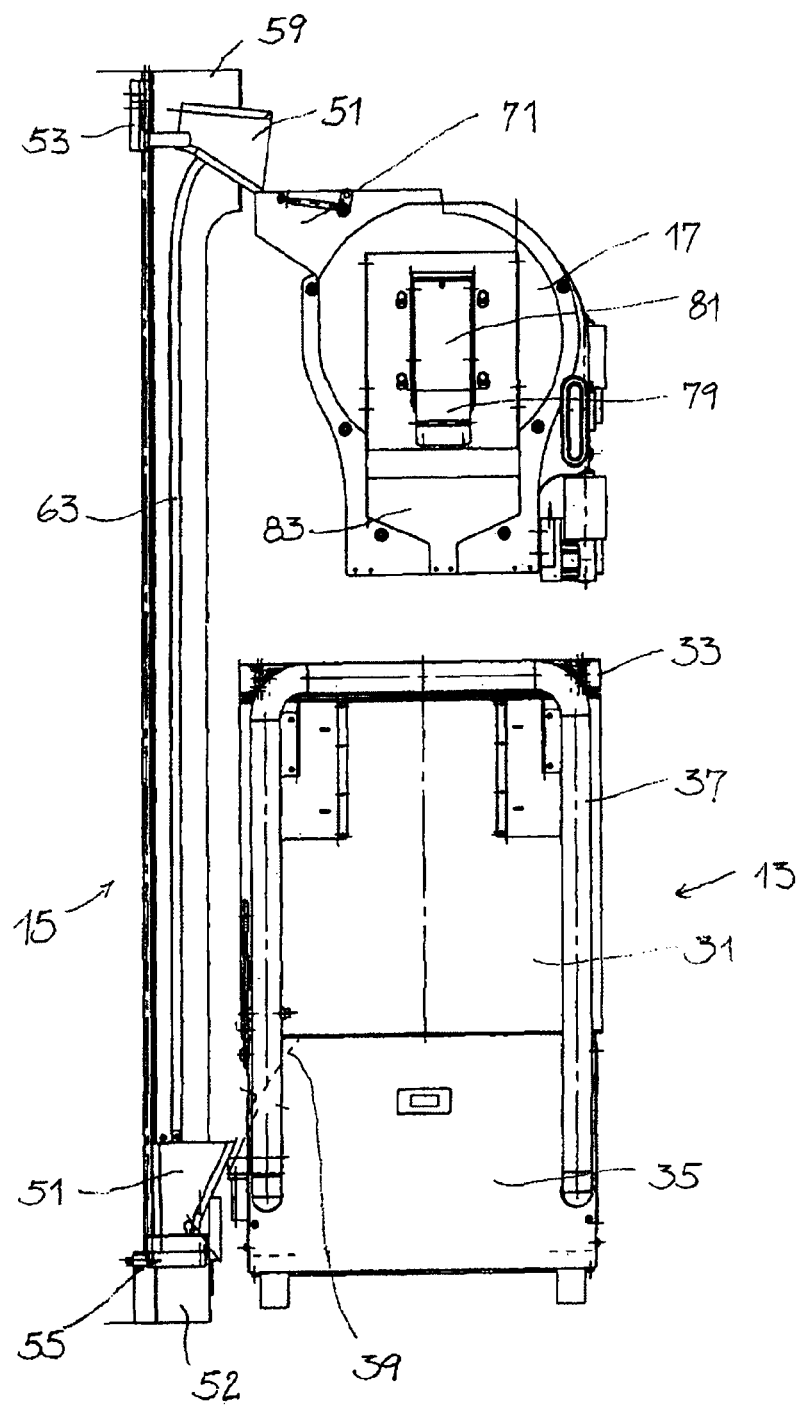
FIG. 2 shows a front view of the automated fryer.

The automated fryer 11 is shown in FIG. 1 without a housing in order to make the storage container 13, the driven transport means 15 and the cooking drum 17 and their mutual alignment easier to see.

The storage container includes a cylindrical barrel with container part 31 and cover 33. The cover 33 can be tilted open for filling the barrel. The container part 31 rests on a moveable base 35. Said base is provided with a guide rod 37 in order to be able to move the storage container 13. Said guide rod 37 is tiltable into a retracted position as in the figures and into an extended position. In the extended position the guide rod extends away from the base inclined upwards so that the base 25 with the storage container 13 can be easily maneuvered.

The base 35 rests with its wheels in a rail 21 so that it is automatically positioned in a correct manner. Said rail 21 is telescopically extendable so that the entire storage container 13 can be moved out of and into the cupboard-like housing 19 as in FIG. 4.

There is a chiller in the base 35 for chilling the interior of the storage container 13 as well as a device for opening and closing the outlet opening of the storage container 13. For this purpose the base is connectable to a power source and a control means of the automated fryer by means of one or two cables (not represented).

The outlet opening 38 is realized in the container floor. It opens out into a chute 39, the food slips from said chute and falls into a transport container 51. The transport container is represented in its bottom end position and in its top end position in FIG. 1. However automated fryers have purely one single transport container. The transport container 51 is secured to a carriage 53. It is pivotally mounted on the carriage 53. The carriage 53 is located to the side next to the transport container 51 so that the floor of the transport container can rest on a weighing device 55 in the bottom end position. So that the drive of the transport means does not put a strain on the weighing device, the transport container is mounted so as to be vertically displaceable relative to a driving means. In the example represented, it sits with a pivotal axis 57 so as to be vertically displaceable in a pivotal axis hub on carriage 53.

Figure 3:
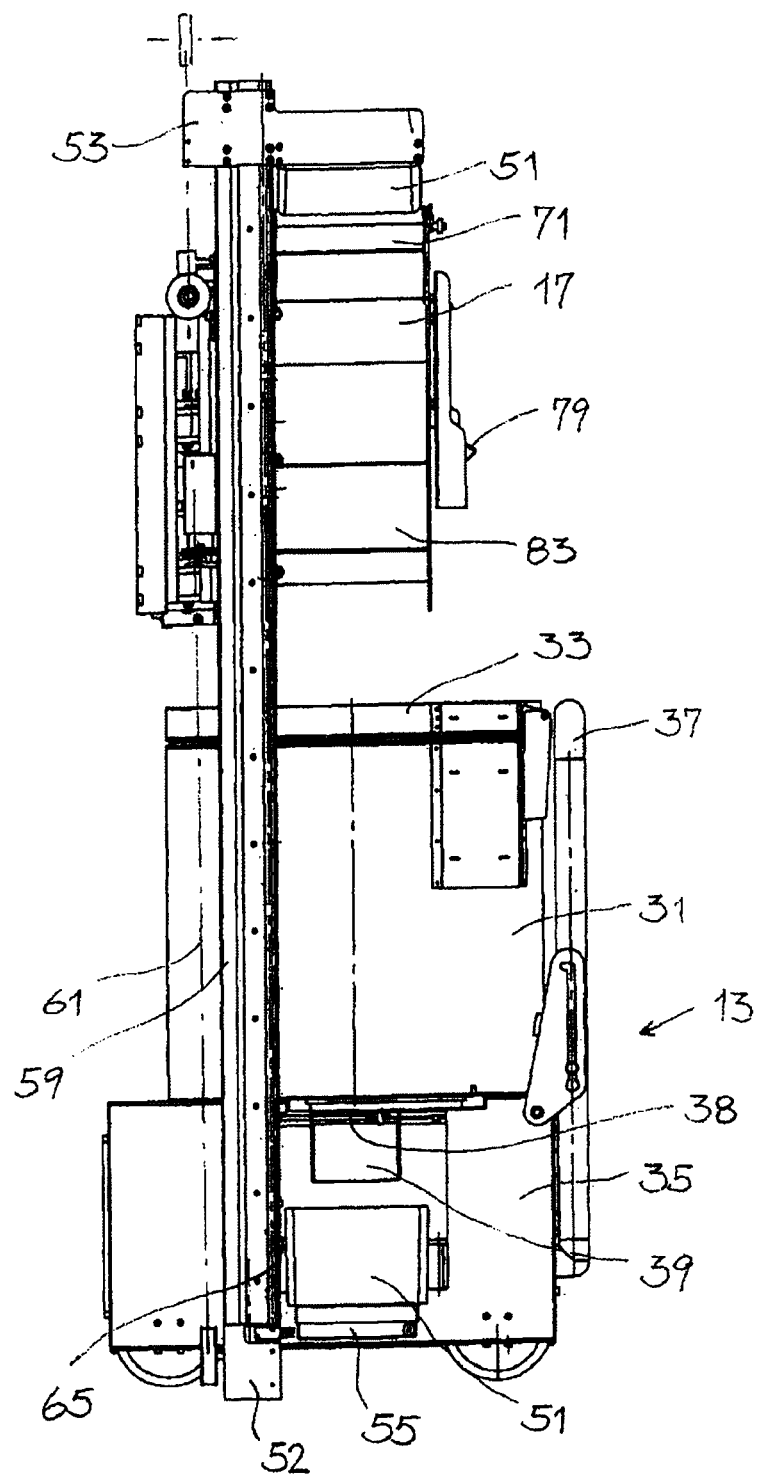
FIG. 3 shows a side view of the automated fryer.

The carriage is guided along a guide and transport rail 59. Said rail has a driven belt 61, to which the carriage 53 is secured, and by means of which the carriage 53 is moved from one to the other end position. There is a container guide 63 in the guide rail 59. On the transport container 51 there is a guide pin 65 (FIG. 3), which engages said container guide 63. The pivotal position of the transport container 51 is determined by the position of the guide pin 65 in the container guide 63 relative to the pivotal axis between transport container 51 and carriage 53. The container guide 63 is curved in the region of the top end position of the transport container 51. This means that the transport container is pivoted from the upright transport position into a pivoted loading position as it approaches said end position. In said loading position the food in the transport container slips into an accommodating means 71 in front of the loading opening 73 of the cooking drum 17.

The cooking drum 17 essentially comprises a horizontal, cylindrical container with a top loading opening 73, an annular-shaped cooking chamber, through which the food is moved by means of a turner 75 that is rotatable about the axis of the cylindrical container. The turner separates the cooking chamber into a plurality of cooking chambers. Said cooking chambers are provided with food through the loading opening one after the other, are rotated (anti-clockwise in FIG. 1) about a central body 77 through the ring-shaped cooking chamber and finally arrive above the central body 77. The cooking chamber is filled with frying oil in the bottom region of the cooking drum so that the food is moved with the turner through the frying oil which is hot when the machine is operating.

Once the food arrives above the central body 77, it falls from there onto a chute 79 in the central body. Said chute leads out of the cooking drum 17. By opening the door 81, it is possible to remove the cooked food from the central body 77. An oil reservoir 83 is incorporated below the cylindrical container of the cooking drum 17, the heating means for heating the frying oil being located in said oil reservoir.

Figure 4:
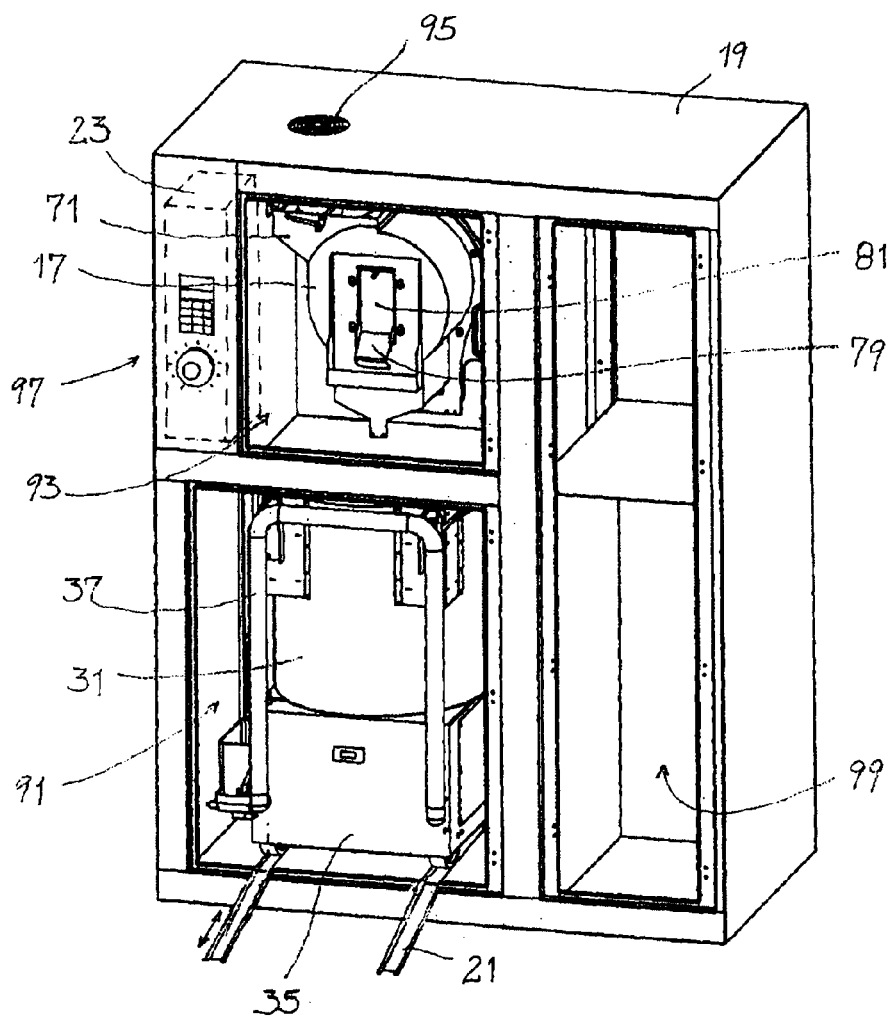
FIG. 4 shows a perspective representation of the automated fryer in a housing.

As can be seen in FIG. 4, the automated fryer 11 is accommodated in an expedient manner in a cupboard-like housing 19. Said housing has a bottom compartment 91 for the storage container 13 and a top compartment 93 for the cooking drum. The guide rail of the transport means extends from the bottom compartment 91 into the top compartment 93. An outlet 95 is realized in the top compartment 93 for the vapors leaking from the loading opening 73.

There is an opening in a closure part (not represented) for the top compartment 93, through which opening the chute 79 extends out of the housing 19 and the door 81 can be operated. Said opening is located in an expedient manner in a recess that is realized in the closure part.

In addition, a control means 23 is accommodated in the housing 19 and can be influenced by means of operating controls 97. The operating controls 97 are located on the surface of the housing 19. The control means matches the movement of the transport container to the rhythm of the turner and controls the supply of the desired amount of food to the transport container.

The housing 19 can have further compartments 99 for accommodating packaging materials, serviettes, ingredients and the like.

The invention claimed is:

1. An automated fryer having a cooking drum for accommodating liquid fat or oil, the cooking drum having a loading opening and a separate removal opening; a rotatable turner provided in the cooking drum for moving the food in the cooking drum from the loading opening to the removal opening while cooking the food; a storage container being located during the cooking operation in a stationary position below the cooking drum, said storage container having a freezer chamber for a plurality of food portions and an outlet opening, a closure to open and close said outlet opening, and transport means for transporting the food from the outlet opening of the storage container to the loading opening of the cooking drum; in an operating position of the automated fryer, the outlet opening of the storage container is located below the loading opening of the cooking drum, and the transport means being designed to comprise a drive in order to transport a single portion of the food contained in a transport container and along a guide rail upward from the outlet opening of the storage container to the loading opening of the cooking drum.

2. The automated fryer as claimed in claim 1, wherein the transport means has at least one moveable transport container, which is moveable from a bottom end position, in which the transport container is situated below the outlet opening of the storage container, into a top end position, in which the transport container is situated above the loading opening of the cooking drum.

3. The automated fryer as claimed in claim 2, further comprising a weighing device provided in a region of the bottom end position of the transport container, and the transport container being able to rest on said weighing device when in the bottom end position.

4. The automated fryer as claimed in claim 2, wherein the transport container is located on at least one guide rail.

5. The automated fryer as claimed in claim 2, wherein the transport container is pivotable or tiltable in said top end position.

6. The automated fryer as claimed in claim 2, wherein the transport container is located on a moveable carriage.

7. The automated fryer as claimed in claim 6, wherein the carriage is moveable by means of one of a spindle and a toothed belt that is driven by means of an electric motor.

8. The automated fryer as claimed in claim 4, wherein a guide element is provided at the top end of the at least one guide rail in order, interacting with the transport container, to utilize the transport movement of the transport container for generating a pivotal movement of the transport container.

9. The automated fryer as claimed in claim 1, wherein the storage container is a freezer container.

10. The automated fryer as claimed in claim 1, wherein the storage container, the cooking drum and the transport means are located within a common housing.

11. The automated fryer as claimed in claim 10, wherein the storage container is located so as to be displaceable relative to the housing in order to be able to be filled or changed in a position pulled out of the housing, and wherein in a position pushed into the housing, the outlet opening opens out into the transport container that is located in the bottom end position.

12. The automated fryer as claimed in claim 11, wherein the storage container is located on extendable telescopic rails.

13. The automated fryer as claimed in claim 1, wherein a control means is provided for synchronizing the transport of the food from the storage container to the cooking drum in dependence on the rotational speed of a turner and on the number of food portions that the turner can accommodate.

14. The automated fryer as claimed in claim 13, wherein the outlet opening of the storage container can only be opened when the transport container is in the bottom end position.

15. The automated fryer as claimed in claim 1, wherein the rotational speed of said rotatable turner and consequently a dwell time of the food in the cooking drum is adjustable.

16. The automated fryer as claimed in claim 1, wherein the transport means has one movable shuttle transport container, which is moveable from a bottom end position into a top end position.

* * * * *